United States Patent
Cholleti et al.

(10) Patent No.: US 7,562,204 B1
(45) Date of Patent: Jul. 14, 2009

(54) IDENTIFYING AND RELOCATING RELOCATABLE KERNEL MEMORY ALLOCATIONS IN KERNEL NON-RELOCATABLE MEMORY

(75) Inventors: Udayakumar Cholleti, Cupertino, CA (US); Sean McEnroe, North Borough, MA (US); Stan J. Studzinski, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 449 days.

(21) Appl. No.: 11/393,933

(22) Filed: Mar. 29, 2006

(51) Int. Cl.
*G06F 12/00* (2006.01)

(52) U.S. Cl. ............... 711/206; 711/163; 711/165; 711/203; 711/207; 711/209

(58) Field of Classification Search ............ None
See application file for complete search history.

(56) References Cited

U.S. PATENT DOCUMENTS

2006/0064562 A1* 3/2006 Mohideen et al. .......... 711/170

2008/0005495 A1* 1/2008 Lowe et al. .......... 711/152

OTHER PUBLICATIONS

Eykholt et al., "*Beyond Multiprocessing . . . Multithreading the SunOS Kernel,*" SunSoft, Inc., Summer '02 USENIX, Jun. 8-Jun. 12, 1992, San Antonio, Texas.
Sun Microsystems Computer Company, "*The Solaris Memory System,*" Sizing, Tools and Architecture, May 1998.
Sun Microsystems, Inc., "*Solaris Memory Architecture,*" Copyright 1997.
Jim Mauro, "*Swap space implementation, part one,*" SunWorld, Dec. 1997, http://sunsite.uakom.sk/sunworldonline/swol-12-1997/swol-12-insidesolaris.html.

* cited by examiner

*Primary Examiner*—Reginald G Bragdon
*Assistant Examiner*—Shawn X Gu
(74) *Attorney, Agent, or Firm*—Martine Penilla & Gencarella, LLP

(57) ABSTRACT

A method for identifying relocatable kernel memory allocations in kernel non-relocatable memory is described. In this method, a physical address hardware mapping entry (PA HME) for each process accessing a physical page of memory by physical addresses. For each of the PA HMEs corresponding a process that does not permit page relocation, the pre-relocation handler and post-relocation handler references of each PA HME is set to null. Each PA HMEs is associated with a pmapping list for the physical page. Thus, A physical page is identified as non-relocatable when one of the PA HMEs referenced by the pmapping list has null pre-relocation and post-relocation handler references.

14 Claims, 3 Drawing Sheets in# IDENTIFYING AND RELOCATING RELOCATABLE KERNEL MEMORY ALLOCATIONS IN KERNEL NON-RELOCATABLE MEMORY

CROSS REFERENCE TO RELATED PATENT APPLICATIONS

This application is related to U.S. patent application Ser. No. 10/838,495, filed on May 3, 2004 and entitled "Accessing Physical Memory Using a Partitioned Kernel Virtual Memory Address Space," which is hereby incorporated by reference in its entirety.

BACKGROUND

Computer operating systems require memory to store data related to operating system functions. Relocation of data from one physical memory location to another is sometimes necessary. For example, if one memory board begins to fail, it might be desirable to replace it. In addition, in a distributed computing system, it is sometimes helpful to migrate a process from one processor to another, for example, so that the process is closer to resources being accessed by the process. When a process is migrated, it can reduce latency and bus traffic if the data being accessed by the processor is located on the same board or otherwise close to the processor executing the process.

A portion of a computer's memory is allocated to the operating system kernel. The kernel memory is allocated from the main memory of the system and is generally partitioned into relocatable pages of kernel memory and non-relocatable (NR) pages of kernel memory. Data that is designated NR by the kernel is stored in NR kernel memory pages.

Modern computers provide each process being executed in a computer system, including the kernel, its own virtual address space. This allows memory to be dynamically allocated to each running process while at the same time providing all the running processes with contiguous address space. Virtual address spaces also allows a process to use more memory than is physically available in the system by paging little-accessed data to secondary storage. In many cases, a single page of physical memory is shared by a plurality of processes, each having a different VA that references that physical page.

A page of memory is the smallest unit of memory that can be allocated or mapped. The computer operating system and hardware work together to map the virtual addresses assigned to each process to corresponding physical pages thereby making the appropriate location in memory available when needed by a process. Page size can be fixed for all processes, or may vary from process to process. For example, if the physical page size is 8 kilobytes, a process can request or be directed to use virtual page sizes of multiples of 8K, e.g., 8K, 64K, 512K, 4M, 32M, 256M, 2 G, and 16 G. The use of user-defined page sizes can permit an application to optimize performance. Larger page sizes can reduce translation buffer miss rates while smaller page sizes can improve the utilization efficiency of the memory.

Relocating memory being accessed by its corresponding VA requires only that the mappings be updated to reflect the new physical address of the data after it is relocated. However, there are situations in which data is accessed using its physical address (PA) which can make relocating the data more difficult. For example, direct memory access (DMA) allows certain hardware or software subsystems within a computer to directly access system memory for reading and/or writing independently of the processor or processors. Many subsystems use DMA including secondary storage controllers, display interfaces, and network interfaces. In a DMA transfer, a block of memory is copied from one device to another. While a processor may initiate the transfer, the transfer itself is performed by a DMA controller. Since DMA bypasses the processor, which is responsible for performing VA to PA translations, the DMA controller accesses system memory using the physical address of the memory, not a virtual address. As a result, some device drivers may require allocations of NR kernel memory. This prevents the data from being moved during DMA transfers. The kernel will also store NR data such as the kernel stack and text in the NR partition of the kernel memory.

If relocatable kernel memory becomes full, it is possible to store relocatable data in the NR kernel memory partition. However, there then exists a need to move relocatable data to the relocatable kernel memory partition if more space in the NR partition is needed.

To identify relocatable data in an NR region of kernel memory, related U.S. patent application Ser. No. 10/838,495, filed May 3, 2004, proposes partitioning the kernel virtual address space into relocatable and nonrelocatable regions. In that application, relocatable data is always assigned a virtual address in the relocatable partition of the virtual address space. Thus, when relocatable data is stored in the NR partition, it can be identified by its virtual address, which would remain in the relocatable partition of the virtual address space.

This solution works well for systems having a 64 bit address space. However, in systems having 32 bit addresses, such as the popular x86 architectures, partitioning the virtual address space imposes a burdensome artificial restriction on the memory. Furthermore, even in a 64 bit environment, identifying the virtual address of a physical page for the purpose of determining whether a particular page of data is relocatable or not can be an inefficient procedure.

Therefore, there exists a need to efficiently identify which pages in nonrelocatable memory contain relocatable data without placing artificial restrictions on the kernel's virtual address space, so that, if necessary, nonrelocatable memory may be freed by moving the relocatable data to the relocatable kernel memory partition.

SUMMARY

Broadly speaking, the present invention fills these needs by providing a mechanism for identifying relocatable kernel memory allocations in non-relocatable kernel memory.

It should be appreciated that the present invention can be implemented in numerous ways, including as a process, an apparatus, a system, a device, or a method. Several inventive embodiments of the present invention are described below.

In one embodiment, a method for identifying relocatable kernel memory allocations in kernel non-relocatable memory is provided. In this method, a physical address hardware mapping entry (PA HME) is allocated for each process accessing a physical page of memory by its physical address. For each of the PA HMEs corresponding to a process that does not permit page relocation, pre-relocation handler and post-relocation handler references of each PA HME are set to null. Each PA HME is associated with a pmapping list for the physical page. Thus, a physical page is identified as non-relocatable when one of the PA HMEs referenced by the pmapping list for that page has null pre-relocation and post-relocation handler references.

In another embodiment, a method for relocating relocatable kernel allocations in kernel non-relocatable memory is provided. The method includes determining whether an initial page is relocatable and relocating the initial page to a replacement page when the initial page is determined to be relocatable. The initial page is determined to be relocatable by traversing a pmap list. The pmap list being a linked list of hardware mapping entries (HMEs) for the initial page. The traversing allows for any physical address (PA) HMEs referenced by the pmap list to be identified. The initial page is determined to be non-relocatable when one of the PA HMEs has null pre-relocation and post-relocation handler references.

In yet another embodiment a machine readable medium is provided having processor instructions for managing kernel non-relocatable memory. Specifically, the processor instructions determining whether an initial page in physical memory is non-relocatable. To do so a plurality of data structures are traversed, wherein each data structure is referenced by an adjacent data structure. Each of the data structures are one of a virtual address hardware mapping entry (VA HME) or a physical address hardware mapping entry (PA HME). Each VA HME corresponds to a process accessing the initial page by virtual address, and each PA HME corresponds to a process accessing the initial page by physical address. The processor instructions determine from the PA HMEs whether the initial page is relocatable. If the initial page is relocatable, processor instructions for relocating the initial page to a replacement page are provided.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1:
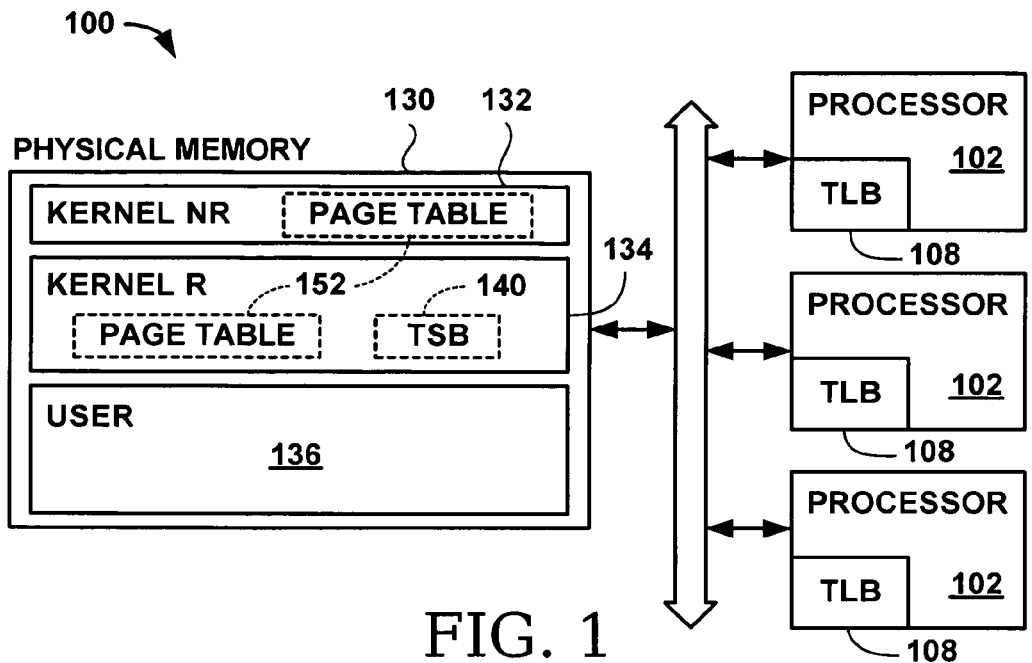
FIG. 1 presents a schematic representation of an exemplary computer system.

FIG. 1 shows a schematic representation of an exemplary computer system 100. Specifically, computer system 100 includes processors 102 and physical memory 130. Physical memory 130 includes non-relocatable (NR) kernel memory 132, relocatable kernel memory 134, and user memory 136. Note that memory allocates between the user and the kernel are not necessarily contiguous as shown, but can be scattered. To translate virtual addresses into a physical memory addresses, a variety of means are provided including at least a translation buffer and page table 152.

In one embodiment, multiple level translation buffers are provided including translation lookaside buffers (TLB) 108 and translation storage buffers (TSB) 140. Each processor 102 contains at least one TLB, which may be shared between any number of processing cores. In one embodiment, the TLB is very fast content-addressable memory and acts as a high speed cache for virtual-to-physical address mapping data. Each entry in the TLB is a translation table entry (TTE). The TTE contains the information necessary to translate a virtual address (VA) for a particular process into a page frame number (PFN), which identifies a physical page in memory that corresponds to the VA. In addition, the TTE includes several flags providing various status information of the page in memory. TSB 140 resides in relocatable kernel memory 134 and portions of the page table 152 reside in NR kernel memory 132 or both NR kernel memory 132 and relocatable kernel memory 134.

Translation is performed by a combination of hardware and software processes. When a user process allocates memory, space is created in that user's virtual address space by the kernel. In one embodiment, physical memory is not allocated until the user then touches this virtual memory location. When this happens, the processor executing the process will search TLB 102 for a TTE corresponding to the virtual address (VA) allocated which will then give a corresponding PFN. The TLB 102 will signal a cache miss if does not contain a TTE for the VA. The kernel will then check TSB 140 to see if it contains a valid TTE for the VA. In one embodiment, TSB 140 contains a data structure for each running process and holds many more TTEs than TLB 108. It should be noted that not all systems use a TSB 140 in which case the kernel will access page table 152 directly when a TLB cache miss occurs. In the present example, where there is a TSB 140, the kernel checks TSB 140 before searching page table 152. If the TTE is found in the page table, it is copied to the TSB and TLB (or just the TLB if the system does not provide a TSB). If the TTE is not found, a page fault exception occurs, which could result in allocating physical memory and generating a mapping to the VA. Page faults also occur, for instance, when the page has been swapped to secondary storage or the mapping entry has for some reason been stolen by another process.

Figure 2:
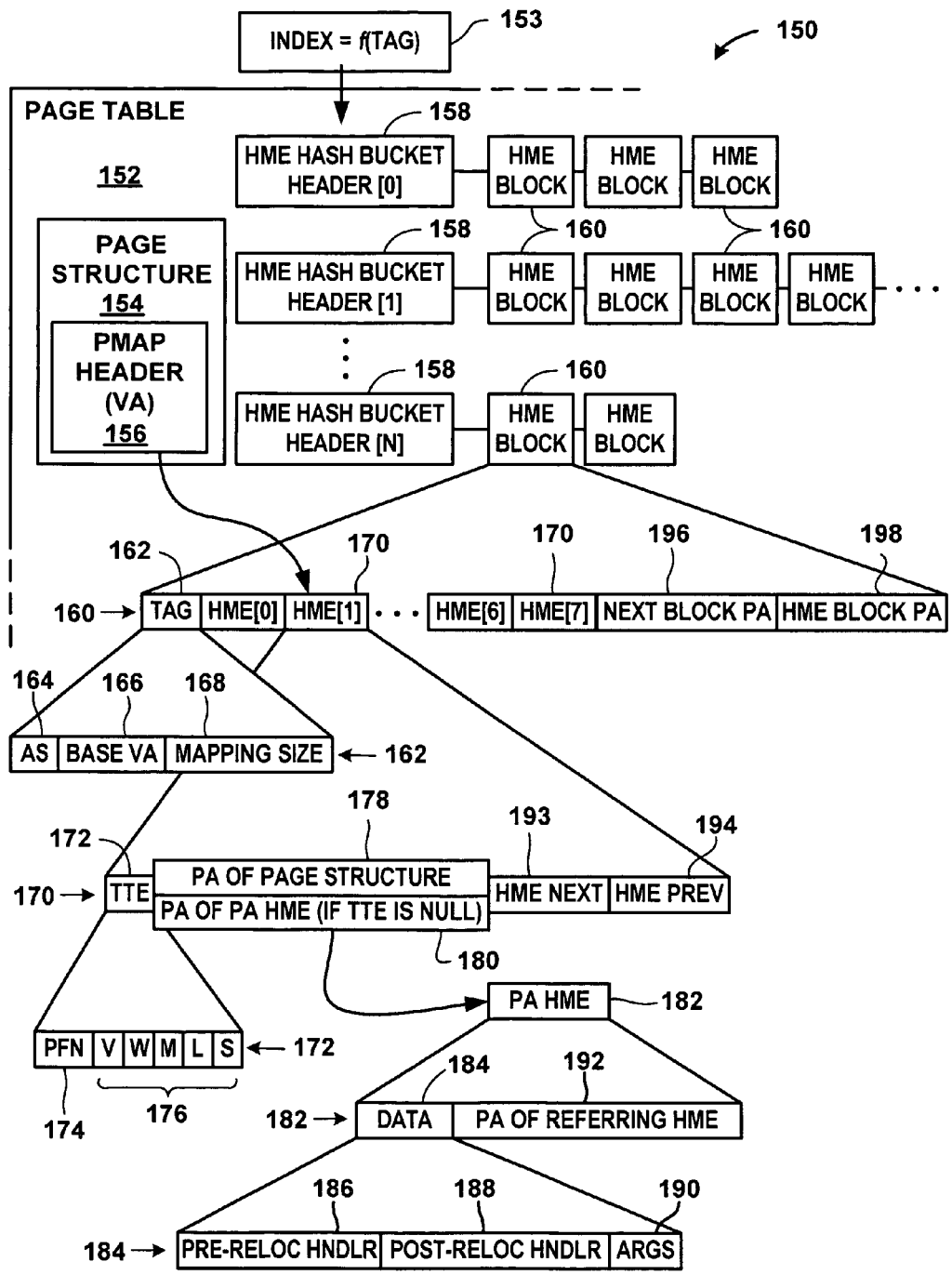
FIG. 2 shows a schematic representation of a page table data structure for mapping virtual-to-physical addresses.

FIG. 2 shows a schematic representation of a page table data structure 150 for mapping virtual-to-physical addresses. In this example, to find a mapping for a particular VA, the kernel will first determine a hash bucket header index by running a hashing function 153 on a tag 162, which contains known values. Specifically, tag 162 contains the address space identifier (AS) 164, the base VA 166, and, for systems allowing variable virtual page sizes, the mapping size 168. The AS is an identifier of the process waiting for the address translation. Since each process has its own virtual address space, the same VA for different processes may correspond to different physical pages. Thus, the address translation layer of the kernel must identify the TTE corresponding to the correct address space. Base VA 166 is the VA with a number of the least significant digits set to zero. The mapping size 168 is the virtual page size used by the particular process. These values are input into hashing function 153 that returns a hash bucket header index value. This index value identifies one of hash bucket headers 158 in page table 152. Each hash bucket header contains the physical address of a first hardware mapping entry (HME) block 160 in a linked list of HME blocks. Each HME block 160 includes a next HME block reference 196. The last HME block in the linked list has a null next HME block reference.

To find a PFN for a given VA, the linked list of HME blocks 160 is traversed and the Base VA 166 is checked to see if it matches the significant digits of the given VA. If not, then the next HME block reference 196 is checked. If it is not null, then the next HME block in the linked list is accessed until the end of the list, i.e., a null HME block reference, is reached.

Each HME block 160 has a number of HMEs 170. In one embodiment, each HME block 160 has eight HMEs 170 indexed zero through seven. Each HME 170 contains a TTE 172 that is copied to the TSB and TLB. The TTE 172 contains a PFN 174 to identify the location in physical memory corresponding a given VA. In addition, a number of flags 176 are provided. In this embodiment, flags 176 include V, W, M, L, and S corresponding to valid, writeable, modified, locked, and suspend flags, respectively. The suspend flag is discussed below, however persons skilled in the art will recognize the significance of these flags, the details of which need not be described here.

If, while traversing an HME block linked list, an HME block 160 is found with a matching tag 162, then the appropriate HME 170 in that HME block 160 is identified. The appropriate HME 170 in the HME block 160 can be located by multiplying the least significant digits of the VA by the size of each HME 170 and adding the resultant product to the address of the first HME 170 in the HME block 160. Thus, the VA assigned to each HME 170 is Base VA 166 plus the HME index number. In exemplary embodiments, the mapping size may vary and can be defined differently for each process. Typical mapping sizes are 8 KB to 1 MB or more, depending on the application. The mapping size determines how many individual addresses each TTE can translate, and thus represents the smallest block of physical memory that can be allocated to the process.

If the kernel comes to the end of a linked list, identified by a null next HME block reference 188, or TTE 174 or validity flag V is null when a correct HME block is located, then the page table has no PFN or physical memory assigned to the given VA. In this case, a page fault exception is raised and a trap handler invoked to service the page fault. If necessary, physical memory is allocated and assigned to the VA and an HME is created, and if necessary, a new HME block is allocated to hold the HME.

There are times when it is useful to identify all the processes that utilize a particular physical page. For example, a page out daemon (not shown) will want to identify all the virtual addresses corresponding to a particular physical page when exiting a program so that the physical memory can be freed and then used by other processes. To do so, the kernel can access the page structure 154 in page table 152 that corresponds to the particular physical page. Thus, each physical page has a page structure 154 containing various parameters relating to that location in memory. One parameter is the pmap header 156, which is a pointer to a virtual address (in the kernel virtual address space) of the first HME 170 that contains a particular PFN 174. Each HME contains an HME next pointer 193 and an HME previous pointer 194 to provide addresses of the next and previous HMEs in the pmap linked list of HMEs that relate to the particular PFN. Thus, all the processes that share a particular page in physical memory can be identified by reading AS 164 from the HMEs in the pmap linked list for that page. The pmappings are maintained by the page fault handler so that when it creates a new HME, it places it into the pmap list for the corresponding page structure 154.

Each HME having virtual-to-physical mappings contains a PFN 174 that corresponds to the AS and VA, the VA being determinable by its position in HME block 160 as described above. HMEs having virtual-to-physical mappings may be referred to as "VA HMEs." The pmap linked list therefore contains a VA HME for every address translation for a particular physical page. Thus, if there are 5 processes each having a VA corresponding to a particular physical page, the corresponding page structure 154 will contain a pmap header 156 pointing to the first HME in a pmap linked list having five VA HMEs. Note that the VA HMEs can only identify virtual to physical translations and cannot identify processes or subsystems accessing memory directly using the physical address.

In one embodiment however, dummy HMEs can be allocated for each process accessing memory directly using the physical address. It should be noted that each VA HME 160 having virtual-to-physical address mappings contains page structure pointer 178 containing the physical address of the page structure 154 corresponding to the process identified by the AS 164 of that HME 160. For HMEs that do not contain virtual-to-physical address mappings, the TTE is set to null, and the HME contains a PA HME pointer 180 instead of the page structure pointer 178.

In one embodiment, these structures are implemented in code as follows:

TABLE 1

```
struct pa_hment {
/* The fields in the pa_hment */
        pointer to pre_relocation_handler;
        pointer to post_relocation_handler;
        arguments to the above handlers;
        pointer to the corresponding sf_hment;
};
struct sf_hment {
tte_t       hme_tte;            /* tte for this hment */
union {
    struct page *page;          /* what page this maps */
    struct pa_hment *data;      /* pointer to pa_hment */
} sf_hment_un;
    struct sf_hment *hme_next;  /* next hment */
    struct sf_hment *hme_prev;  /* prev hment */
};
#define hme_page    sf_hment_un.page
#define hme_data    sf_hment_un.data
#define hme_size(sfhmep) ((int)(TTE_CSZ(&(sfhmep)->hme_tte)))
#define PAHME_SZ    (sizeof (struct pa_hment))
#define SFHME_SZ    (sizeof (struct sf_hment))
```

In one embodiment, the pmap list will contain a PA HME 182 for each subsystem accessing memory by its physical address. Each subsystem allowing relocation of the data will provide a pre-relocation handler and a post-relocation handler, which allow the subsystem to cooperate with the page relocation procedure. To enable execution of these handlers, PA HME 182 contains data 184, which includes the PA of a pre-relocation handler 186, the PA of a post-relocation handler 188, and arguments 190. PA HME 182 also includes a pointer 192 containing the PA of the referring HME 170. In one embodiment, if pre-relocation handler 186 and post-relocation handler 188 are both null, then the physical page identified by the HME is non-relocatable (NR).

When PA HME 182 is allocated, it is assigned a fictitious VA equal to the PFN of the physical address as a place holder. Thus, the position of a particular dummy HME in one of HME blocks 160 is based on the fictitious VA, which is the same as the physical address. Since VA equals PFN, the PFN is determinable from its position in HME block 160 just as the VA is determined for particular VA HMEs as described above. To determine the correct HME hash bucket header 158 index, the fictitious base VA, mapping size, and the kernel AS are used in hashing function 153.

There exists the possibility then that there are two HMEs—a VA HME and a PA HME—having the same VA (or fictitious VA) and having an identical tag 162 and are therefore locatable in the same position of a particular HME block 160. If, when allocating a VA HME, the appropriate slot for an HME block is occupied by a PA HME (or vice versa) then a new HME block may be allocated for the new HME. Likewise, when traversing an HME block linked list for a particular translation, the TTE 172 is checked to insure that it contains data for an actual VA.

Figure 3:
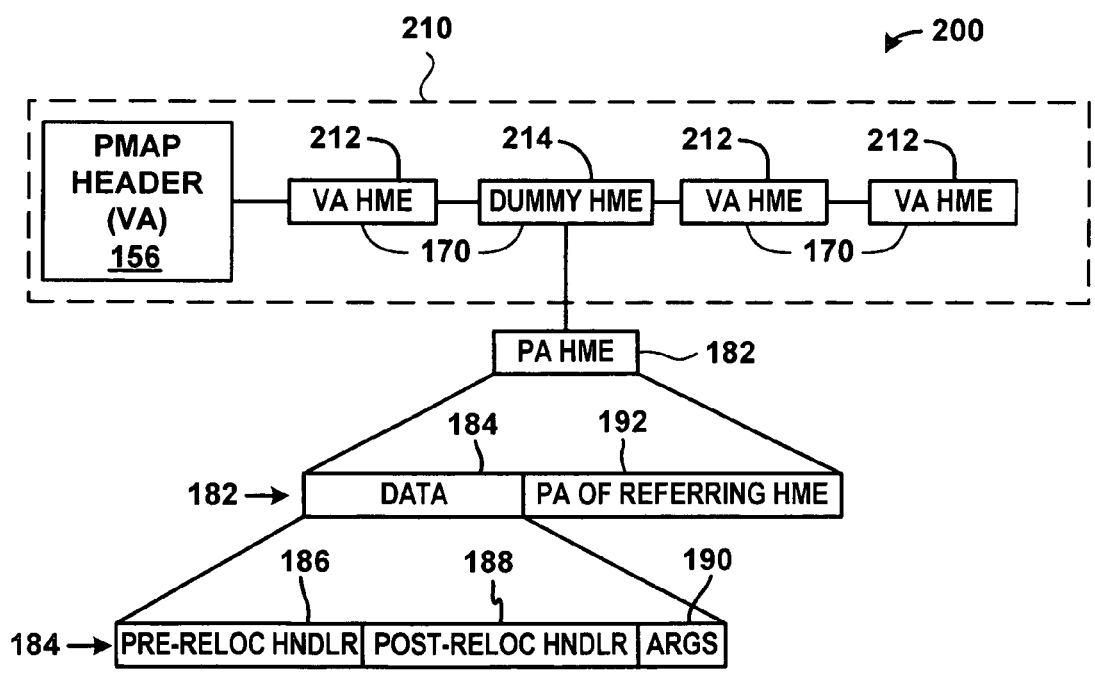
FIG. 3 shows a schematic representation of a pmap linked list containing a plurality of hardware mapping entries.

FIG. 3 shows a schematic representation 200 of a pmap linked list 210 containing a plurality of HMEs 170. Pmap linked list 210 includes pmap header 156 and any number of VA HMEs 212 and dummy HMEs 214. Each VA HME 212 contains a TTE as mentioned above with respect to FIG. 2, the TTE providing a virtual-to-physical mapping. Each dummy HME 214 includes a pointer to PA HME 182. PA HME 182 identifies the physical page as being unmovable if it contains null pre-relocation and post-relocation handlers 186, 188. The use of a dummy HME allows for a consistent data structure for all HMEs. It is possible, however, to reference a PA HME directly from a preceding VA HME or PA HME rather than indirectly using a dummy HME.

As mentioned above, in one embodiment, each subsystem accessing relocatable memory through its physical address is required to provide a pre-relocation handler and a post-relocation handler along with data specific to that subsystem when setting up the physical address mapping. Once the physical address mapping is set up by allocating a PA HME, the subsystem can start accessing the relocatable memory by the physical address. When the subsystem no longer needs to access the memory using the physical address, it will destroy the PA HME.

When non-relocatable memory is allocated, a PA HME 182 is allocated with pre-relocation and post-relocation handlers 186, 188 set to NULL. Note that the physical address mapping is in addition to the virtual-to-physical address mapping. When the non-relocatable memory is freed, the PA mapping is unloaded along with any virtual-to-physical address mappings.

To identify relocatable pages in non-relocatable partition of kernel physical memory, the pmap linked list 210 is traversed. As mentioned above, if the pmap linked list 210 includes a dummy HME 214 referencing a PA HME with the pre-relocation and post-relocation handlers 218, 220 set to NULL, then that page is a non-relocatable page. Otherwise, it is a relocatable page.

Figure 4:
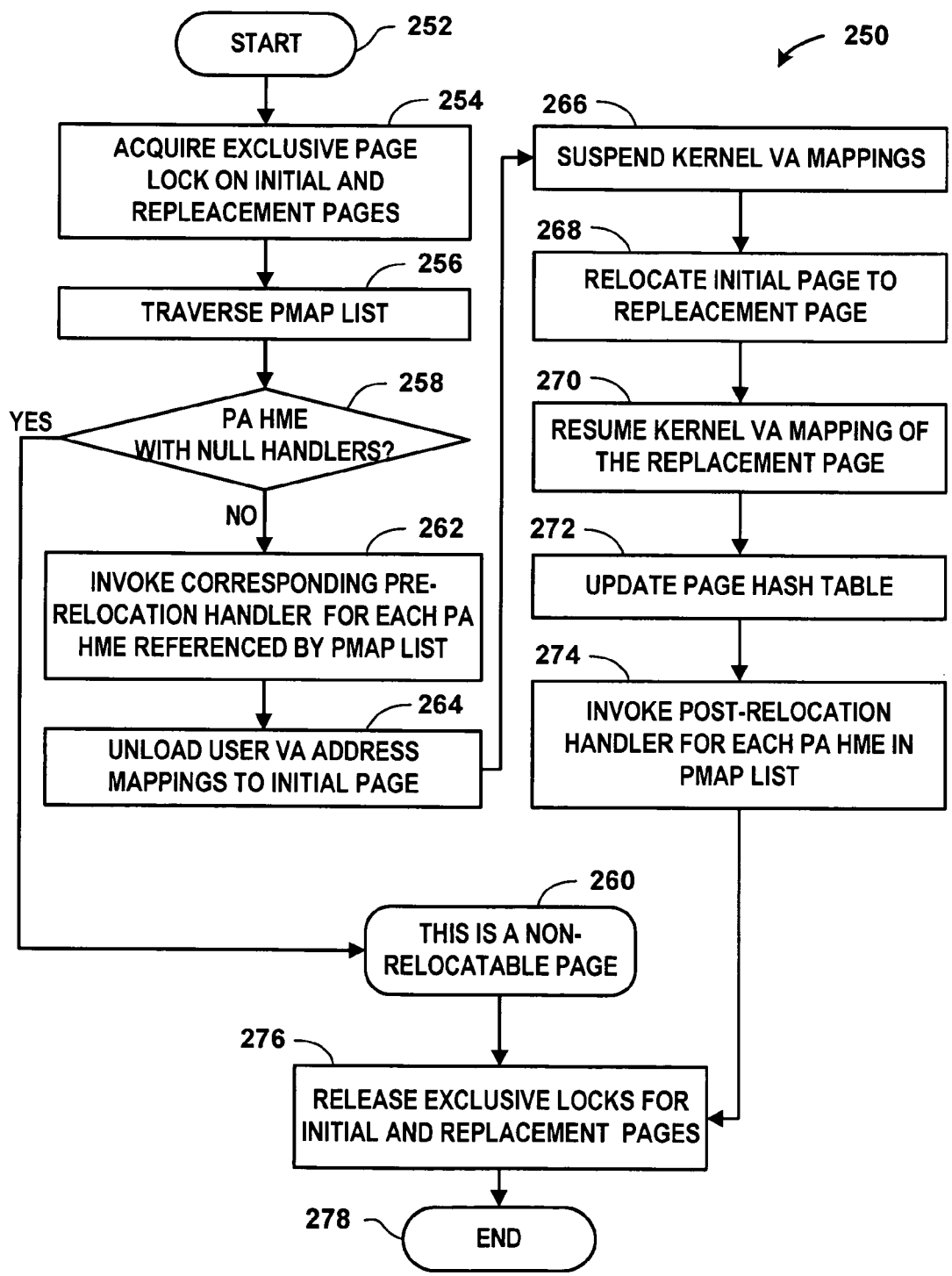
FIG. 4 shows a flowchart depicting an exemplary procedure for identifying and relocating relocatable kernel memory allocations.

FIG. 4 shows a flowchart 250 depicting an exemplary procedure for identifying and relocating relocatable kernel memory allocations, which is described below with reference to FIGS. 2 and 3. If the data stored in the page is not designated as non-relocatable data, then it is moved from an initial page in physical memory to a replacement page in physical memory. The procedure begins as indicated at start block 252 and flows to operation 254 wherein an exclusive page lock is acquired on each of the initial and replacement pages. The exclusive page lock prevents other threads from accessing the physical pages during the relocation procedure. The procedure then flows to operation 256.

In operation 256, the pmap list 210 is traversed to identify the various processes and/or subsystems accessing the physical page to be moved. The procedure then flows to operation 258.

In operation 258, it is determined whether the pmap list 210 contains any dummy HMEs referencing PA HMEs having null handlers. If so, then the procedure flows to information block 260, which indicates that the current physical page is non-movable. Information block is provided to simply show that at that point in the procedure it is known that the physical page is NR and does not necessarily represent any action. In an actual implementation, a system call for relocating the data could at that point return an error code indicating the page to be NR. The procedure then flows to operation 276 wherein the exclusive locks for the initial and replacement pages are released. The procedure then ends as indicated by ending block 278. Returning to operation 258, if it determined that there were no dummy HMEs referencing a PA HME having null handlers, then the procedure flows to operation 262.

In operation 262, for each PA HME referenced by the dummy HMEs in the pmap list, the corresponding pre-relocation handler is invoked. The pre-relocation handlers will prevent their respective subsystems from accessing the page during the relocation procedure. This is necessary because the subsystems do not normally require obtaining control of the page lock before accessing a page. After the pre-relocation handlers are executed, the procedure flows to operation 264.

In operation 264, the user VA address mappings to the initial page are unloaded. In this operation, the TLB and TSB are flushed to remove references to the initial physical page. In addition, the valid bit in flags 176 for each TTE 172 in the pmap list is cleared. If a thread attempts to access the physical page by a virtual address, it will not find a valid TTE and therefore page fault. The page fault handler will then attempt to recreate the virtual-to-physical mapping. In one embodiment, the mappings are determined from vnode and offset information using the page hash tables (not shown). More information on the use of vnode and offset for describing pages is provided in *The Solaris Memory System*, revision D, May, 1998, published by Sun Microsystems, Inc., pp. 65-86, the contents of which is hereby incorporated by reference. The page fault handler will find the initial page address but will not be able to access it because the relocation process acquired an exclusive lock in operation 254. At this point, the page fault handler will sleep until the exclusive lock is released. When the page fault handler wakes up, it will again recreate a mapping entry, e.g., by searching the page hash tables using vnode and offset, but this time find the new page as will be described in further detail below. After the user VA address mappings to the initial page are unloaded, the procedure flows to operation 266.

In operation 266, the kernel VA mappings are suspended. To suspend the kernel VA mappings, the suspend flag in TTE flags 176 is set. The suspend flag temporarily prevents the kernel from accessing the physical memory by the virtual addresses. After suspending kernel VA mappings, the procedure flows to operation 268.

In operation 268, the initial page is relocated to the replacement page. In this operation, data from the initial page is copied to the replacement page. In addition, the pmap list 210 is relocated to the page structure for the replacement page and PFN 174 is corrected for each HME. After relocating, the procedure flows to operation 270.

In operation 270, kernel VA mappings are resumed. Thus, the suspend bits in the TTE for the kernel VA mappings is cleared. After clearing the suspend bits, the procedure flows to operation 272.

In operation 272, the page hash table is updated. The page fault handler accesses the page hash table (not shown) to identify a PFN corresponding to a given VA and AS for recreating an HME for a particular translation. In one embodiment, the page fault hander first determines vnode and offset values for a particular VA and AS. The vnode and offset values are stored in the virtual address layer and are determinable from the VA and AS known to the page fault handler. The vnode and offset values are input into a hashing algorithm to determine an index for the page hash table. The page hash table then provides the PFN in a manner similar to the HME hash table described above. In operation 272, the page hash table is updated to reflect the new physical addresses. After updating the page hash table, the procedure flows to operation 274.

In operation 274, for each PA HME referenced by the dummy HMEs in the pmap list, the corresponding post-relocation handler is invoked. The post-relocation handlers allow corresponding subsystems to start accessing the memory corresponding to the replacement pages. After all the post-relocation handlers complete, the procedure flows to operation 276.

In operation 276, the exclusive locks for the initial and replacement pages are released. When the exclusive locks are released, any threads that are sleeping as a result of the exclusive locks wake up. If a page fault handler is sleeping, then upon waking up, will access the page hash table to identify a physical address corresponding a VA and AS which generated the page fault. Since the hash table was updated in operation 272, it will now find a PFN pointing to the replacement page. The page will be accessed and a new HME created for the replacement page. After the exclusive locks are released, the procedure ends as indicated by ending block 278.

It should be noted that, while certain operations must precede other operations due to the nature of relocating, the particular order for the steps described above may be modified somewhat without affecting the operation of the algorithm. For example, operations 264 and 266 can be re-ordered as can operations 270 and 272. Furthermore, some steps can be eliminated. For example, the procedure could be used simply to identify relocatable pages in a non-relocatable physical memory partition. In this case, operations 256 and 258 can be performed independently of the other operations, the outcome of operation 258 determining whether a page is relocatable or not. If a particular subsystem is shut down, then the PA HMEs could be used to identify and free memory associated with that subsystem. It is therefore expected that persons skilled in the art will recognize these and other advantages provided by implementing PA HMEs.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. In yet another embodiment a machine readable medium is provided having processor instructions for managing kernel non-relocatable memory.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for identifying and relocating relocatable kernel memory allocations in kernel non-relocatable memory, the mechanism comprising:
   allocating a physical address hardware mapping entry (PA HME) for each process accessing a physical page of memory by physical addresses;
   for each of the PA HMEs corresponding a process that does not permit page relocation, setting pre-relocation handler and post-relocation handler references of said each PA HME to null;
   associating said each PA HMEs with a pmapping list for the physical page;
   determining that the physical page is non-relocatable when one of said each PA HMEs referenced by the pmapping list has null pre-relocation and post-relocation handler references; and
   relocating the physical page to a replacement page when none of said each PA HMEs referenced by the pmapping list has said null pre-relocation and post-relocation handler references.

2. The method of claim 1 wherein the associating comprises allocating a dummy hardware mapping entry (HME) in the pmapping list for each said PA HME, each of the dummy HMEs being identified by having a null translation table entry (TTE), the each dummy HME providing a physical address of a corresponding one of the PA HMEs.

3. The method of claim 2 wherein each of the dummy HME has a virtual address equal to the physical address being accessed by the corresponding process.

4. The method of claim 1 wherein said relocating comprises:
   acquiring an exclusive page lock on the physical page and the replacement page;
   invoking each pre-relocation handler referenced by the PA HMEs associated with the pmapping list for the physical page;
   unloading user virtual address (VA) mappings;
   suspending kernel VA mappings;
   relocating the physical page to the replacement page;
   resuming kernel VA mappings;
   invoking each post-relocation handler referenced by the PA HMEs associated with the pmapping list for the physical page; and
   releasing the exclusive lock for the physical page and the replacement page.

5. The method of claim 4 wherein the unloading includes flushing a translation buffer and clearing a validity flag in each VA HME corresponding to user processes.

6. The method of claim 4 wherein said relocating comprises:
   copying data from the physical page to the replacement page;
   changing a page frame number in each hardware mapping entry in the pmapping list to the replacement page's page frame number; and
   relocating the pmapping list to a page structure for the replacement page.

7. A method for relocating relocatable kernel allocations in kernel non-relocatable memory, the method comprising:
   determining whether an initial page is relocatable; and
   relocating the initial page to a replacement page when the initial page is determined to be relocatable, wherein the determining comprises:
   traversing a pmap list, the pmap list comprising a linked list of hardware mapping entries (HMEs) for the initial page;
   identifying physical address (PA) HMEs referenced by the pmap list; and
   basing the determining on contents of the PA HMEs;
   wherein the determining further comprises assessing whether one of the PA HMEs has null pre-relocation and post-relocation handler references, wherein when none of the PA HMEs have the null pre-relocation and post-relocation handler references, the initial page is determined to be relocatable and when at least one of the PA HMEs have the null pre-relocation and post-relocation handler references, the initial page is determined to be non-relocatable.

8. The method of claim 7, wherein the relocating further comprises:
   acquiring an exclusive page lock on the initial and replacement pages prior to the determining whether the initial page is relocatable;
   invoking each pre-relocation handler referenced by the PA HMEs referenced by the pmap list;
   preventing user processes and kernel processes from using virtual address mappings;
   copying data from the initial page to the replacement page;
   updating a page hash table to reflect relocation of data from the initial page to the replacement page, the page hash table providing information for rebuilding user hardware mapping entries;
   allowing kernel virtual address mappings;
   invoking each post-relocation handler referenced by the PA HMEs referenced by the pmap list; and
   releasing the exclusive page lock for the initial and replacement pages.

9. A method for relocating relocatable kernel allocations in kernel non-relocatable memory, the method comprising:
   determining whether an initial page is relocatable; and
   relocating the initial page to a replacement page when the initial page is determined to be relocatable, wherein the determining comprises:
   traversing a pmap list, the pmap list comprising a linked list of hardware mapping entries (HMEs) for the initial page;
   identifying physical address (PA) HMEs referenced by the pmap list; and
   basing the determining on contents of the PA HMEs;
   wherein the identifying PA HMEs comprises identifying dummy HMEs in the pmap list, dummy HMEs being HMEs with null translation table entries (TTEs), the identifying PA HMEs further comprising accessing each of the PA HMEs referenced by the dummy HMEs.

10. A machine readable medium having processor instructions for managing kernel non-relocatable memory, the processor instructions comprising:
    processor instructions for determining whether an initial page in physical memory is non-relocatable, the determining including traversing a plurality of data structures, each data structure referenced by an adjacent data structure in the plurality of data structures, each of the data structures being one of a virtual address hardware mapping entry (VA HME) or a physical address hardware mapping entry (PA HME), wherein each VA HME corresponds to a process accessing the initial page by virtual address, and each PA HME corresponds to a process accessing the initial page by physical address;
    processor instructions for determining from said each PA HME whether the initial page is relocatable; and
    processor instructions for relocating the initial page to a replacement page when the initial page is relocatable.

11. The machine readable medium of claim 10, wherein the plurality of data structures comprises a pmap list, the pmap list including a linked list of one or more VA HMEs and one or more dummy HMEs, wherein each of the dummy HMEs reference a corresponding one of the PA HMEs.

12. The machine readable medium of claim 10 wherein the initial page is determined be non-relocatable when one of the PA HMEs contains null pre-relocation and post-relocation handlers.

13. The machine readable medium of claim 10 wherein the processor instructions for relocating the initial page to a replacement page comprises:
    processor instructions for acquiring an exclusive page lock on the initial page and the replacement page;
    processor instructions for invoking each pre-relocation handler referenced by the PA HMEs associated with the plurality of data structures;
    processor instructions for unloading user virtual address (VA) mappings;
    processor instructions for suspending kernel VA mappings;
    processor instructions for relocating the initial page to the replacement page;
    processor instructions for resuming kernel VA mappings;
    processor instructions for invoking each post-relocation handler referenced by the PA HMEs associated with the plurality of data structures; and
    processor instructions for releasing the exclusive lock for the initial page and the replacement page.

14. The machine readable medium of claim 13 wherein the processor instructions for relocating comprises:
    processor instructions for copying data from the physical page to the replacement page;
    processor instructions for changing a page frame number in each hardware mapping entry in the pmapping list to the replacement page's page frame number; and
    processor instructions for relocating the pmapping list to a page structure for the replacement page.

* * * * *